US011283954B2

(12) United States Patent
Haginaka

(10) Patent No.: US 11,283,954 B2
(45) Date of Patent: Mar. 22, 2022

(54) PRINT INSTRUCTING DEVICE, PRINTING SYSTEM, AND NON-TRANSITORY COMPUTER READABLE MEDIUM

(71) Applicant: FUJIFILM BUSINESS INNOVATION CORP., Tokyo (JP)

(72) Inventor: Takanori Haginaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 223 days.

(21) Appl. No.: 16/533,902

(22) Filed: Aug. 7, 2019

(65) Prior Publication Data

US 2020/0068082 A1    Feb. 27, 2020

(30) Foreign Application Priority Data

Aug. 21, 2018  (JP) .............................. JP2018-154595

(51) Int. Cl.
*H04N 1/40*       (2006.01)
*H04N 1/00*       (2006.01)

(52) U.S. Cl.
CPC ..... *H04N 1/00779* (2013.01); *H04N 1/00708* (2013.01); *H04N 1/00724* (2013.01); *H04N 1/00726* (2013.01)

(58) Field of Classification Search
CPC ........... H04N 1/00779; H04N 1/00708; H04N 1/00724; H04N 1/00726
See application file for complete search history.

(56) References Cited

U.S. PATENT DOCUMENTS

2012/0236361 A1*  9/2012  Takei ................... G06F 3/1204
                                                             358/1.15

FOREIGN PATENT DOCUMENTS

| JP | 2005-11255   A  | 1/2005 |
| JP | 2006-150800  A  | 6/2006 |
| JP | 4604733      B2 | 1/2011 |

* cited by examiner

*Primary Examiner* — Moustapha Diaby
(74) *Attorney, Agent, or Firm* — Oliff PLC

(57) ABSTRACT

A print instructing device includes: a recording section that, in a case in which history information does not include size information indicating a size of a print medium designated by a print demand that demands an execution of printing, records paper quality information indicating a paper quality of the print medium designated by the print demand in association with the size information in the history information; and a display controlling section that, in a case in which the size information is included in the history information and the paper quality information does not match the history information corresponding to the size information, causes confirmation information confirming whether or not to change the designated paper quality to be displayed.

11 Claims, 9 Drawing Sheets

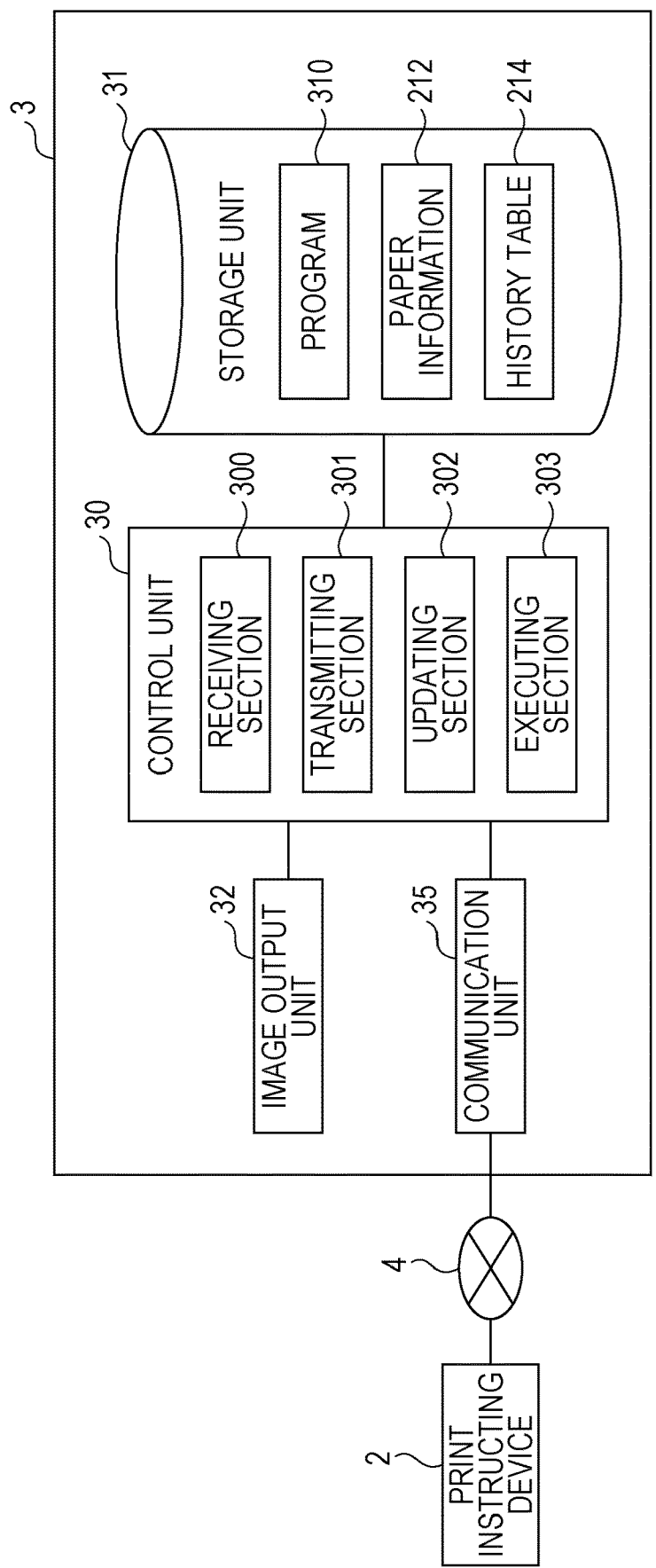

FIG. 7A

| SIZE | PAPER QUALITY |
|---|---|
|  |  |

| SIZE | PAPER QUALITY |
|---|---|
| 100 × 200 mm | THICK PAPER 2 |

| SIZE | PAPER QUALITY |
|---|---|
| 100 × 200 mm | THICK PAPER 2 |
| 100 × 200 mm | PLAIN PAPER |

| SIZE | PAPER QUALITY |
|---|---|
| 100 × 200 mm | THICK PAPER 2 |
| 100 × 200 mm | PLAIN PAPER |
| 100 × 200 mm | THIN PAPER |

| SIZE | PAPER QUALITY | ERROR |
|---|---|---|
| 100 × 200 mm | THICK PAPER 2 | NO |
| 100 × 200 mm | PLAIN PAPER | YES |
| 200 × 200 mm | THIN PAPER | YES |

| SIZE | PAPER QUALITY | USER |
|---|---|---|
| 100 × 200 mm | THICK PAPER 2 | USER A |
| 100 × 200 mm | PLAIN PAPER | USER B |

| SIZE | PAPER QUALITY | PRINT TIME |
|---|---|---|
| 100 × 200 mm | THICK PAPER 2 | 3/16/2018 10:43 |
| 100 × 200 mm | PLAIN PAPER | 3/16/2018 10:55 |
| 100 × 200 mm | THIN PAPER | 3/16/2018 11:03 |

PRINT INSTRUCTING DEVICE, PRINTING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-154595 filed Aug. 21, 2018.

BACKGROUND

(i) Technical Field

The present disclosure relates to a print instructing device, a printing system, and a non-transitory computer readable medium.

(ii) Related Art

In recent years, a printing system enabling appropriate printing onto a paper type intended by a user has been proposed (for example, see Japanese Patent No. 4604733).

The printing system described in Japanese Patent No. 4604733 includes a printing device in which paper types of printing paper housed in respective feed trays are set, and the printing device is able to select a feed tray housing a paper type matching a paper type specified by the print settings of a print job, and print by controlling a printing process on the basis of the paper type onto the printing paper retrieved from the feed tray.

By selecting the feed tray housing the paper type matching the paper type specified by the print settings of the print job in this way, an association is made between the specified paper type and the paper type of the fed paper.

SUMMARY

However, in the case of paper of a non-standard size not registered in the printing system in advance, it may be difficult to register the paper quality in the printing system in association with the size.

Aspects of non-limiting embodiments of the present disclosure relate to moderating the occurrence of printing inexpediences caused by executing printing on a paper having a paper quality that does not match a specified paper quality, even in the case of printing on paper of a non-standard size.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a print instructing device including: a recording section that, in a case in which history information does not include size information indicating a size of a print medium designated by a print demand that demands an execution of printing, records paper quality information indicating a paper quality of the print medium designated by the print demand in association with the size information in the history information; and a display controlling section that, in a case in which the size information is included in the history information and the paper quality information does not match the history information corresponding to the size information, causes confirmation information confirming whether or not to change the designated paper quality to be displayed.

BRIEF DESCRIPTION OF THE DRAWINGS

Exemplary embodiments of the present disclosure will be described in detail based on the following figures, wherein:

FIGS. 3A and 3B are diagrams illustrating examples of notification screens, in which FIG. 3A illustrates one example of a first notification screen, and FIG. 3B illustrates one example of a second notification screen;

FIG. 4 is a block diagram illustrating one example of a control system of the printer illustrated in FIG. 1;

FIGS. 7A to 7D are diagrams illustrating examples of a history table, and together illustrate one example of updating the history table;

FIGS. 8A to 8C are diagrams illustrating examples of the history table according to an exemplary modification.

DETAILED DESCRIPTION

Figure 1:
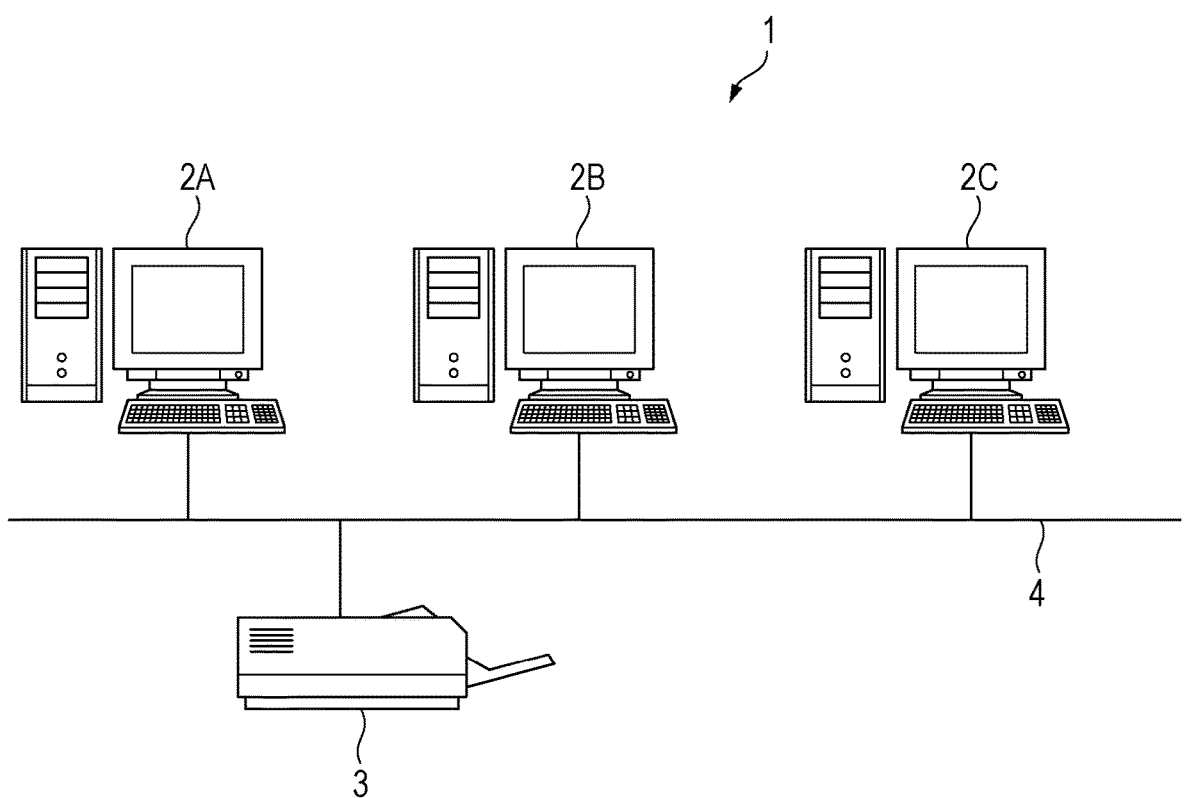
FIG. 1 is a diagram illustrating an exemplary configuration of a printing system according to a first exemplary embodiment of the present disclosure.

Hereinafter, exemplary embodiments of the present disclosure will be described with reference to the drawings. Note that in the drawings, structural elements that have substantially the same function are denoted with the same signs, and duplicate description thereof will be reduced or omitted.

Overview of Exemplary Embodiments

A print instructing device according to the exemplary embodiments of the present disclosure includes: a recording section that, in a case in which history information does not include size information indicating a size of a print medium designated by a print demand that demands an execution of printing, records paper quality information indicating a paper quality of the print medium designated by the print demand in association with the size information in the history information; and a display controlling section that, in a case in which the size information is included in the history information and the paper quality information does not match the history information corresponding to the size information, causes confirmation information confirming whether or not to change the designated paper quality to be displayed.

A "print demand" refers to a user demanding that the print instructing device execute printing. For example, a print demand includes print instructions (also called a "print job") giving instructions to execute printing. A "print medium" refers to printed matter on which image data to be printed is recorded. Print media include, for example, printing paper, magazines, newspapers, posters, flyers, calendars, bags, wrapping paper, postcards, envelopes, and the like.

"History information" is information recording information related to printing performed on a print medium of non-standard size from among printing executed by a printer connected to the print instructing device. The history information is configured to include information indicating the size of the print medium and information indicating the paper quality in particular among the print parameters for executing printing. A "non-standard size" refers to a size pattern for which a paper quality is not specified uniquely even if the size is specified.

First Exemplary Embodiment

FIG. 1 is a diagram illustrating a configuration of a printing system according to a first exemplary embodiment of the present disclosure. The printing system 1 includes a print instructing device 2A used by a first user, a print instructing device 2B used by a second user, a print instructing device 2C used by a third user, and a printer 3 connected to these print instructing devices 2A, 2B, and 2C over a network 4.

The print instructing devices 2A, 2B, and 2C include, for example, a personal computer (PC) or a mobile information terminal such as a tablet or a multifunctional mobile phone (smartphone). Note that the number of print instructing devices 2A, 2B, and 2C is not limited to the number of devices (3) illustrated in FIG. 1, and may also be 1 or 2 devices, and may also be 4 or more devices.

Hereinafter, the print instructing device 2A (also called "PC-A") used by the first user, the print instructing device 2B (also called "PC-B") used by the second user, and the print instructing device 2C (also called "PC-C") used by the third user will be collectively designated simply the "print instructing device(s) 2" where appropriate. The first user, the second user, and the third user are examples of operators.

The printer 3 is one example of a printing device. The printer 3 additionally may be provided with multiple functions such as scanner and copier functions, for example. Note that the number of printers 3 is not limited to the number illustrated in FIG. 2, and two or more printers may also be provided. The network 4 is a local area network (LAN), a wide area network (WAN), the Internet, an intranet, or the like, for example, and may be wired or wireless.

(Configuration of Print Instructing Device 2)

Figure 2:
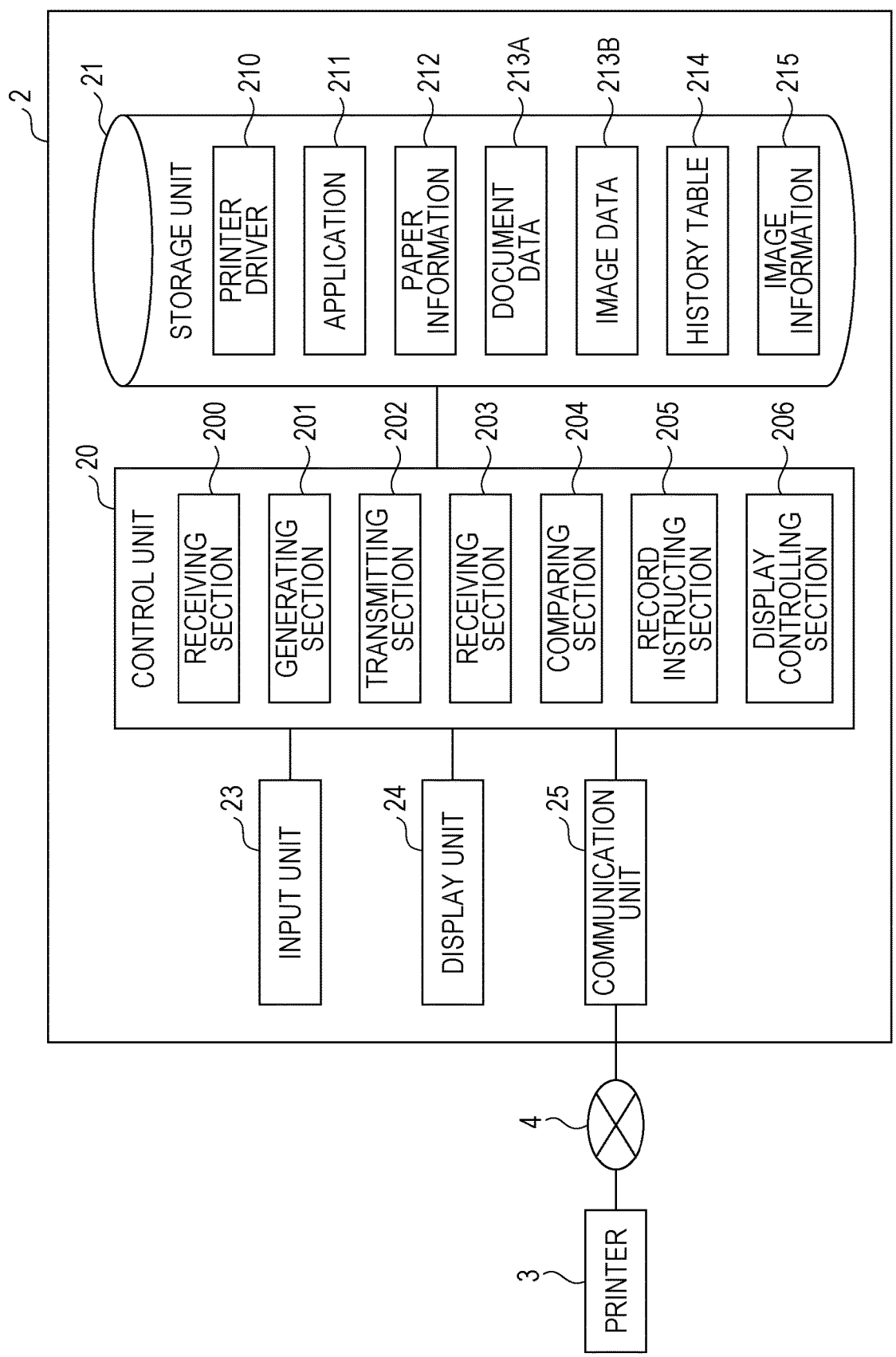
FIG. 2 is a block diagram illustrating one example of a control system of the print instructing device illustrated in FIG. 1.

FIG. 2 is a block diagram illustrating a control system of the print instructing device 2 illustrated in FIG. 1. The print instructing device 2 is provided with a control unit 20 that controls each part, a storage unit 21 that stores various data, an input unit 23 realized by a keyboard, mouse, and the like, a display unit 24 realized by a liquid crystal display or the like, and a communication unit 25 that communicates with the printer 3 over the network 4. The storage unit 21 is one example of a recording section.

The control unit 20 includes a central processing unit (CPU), an interface, and the like. The control unit 20, by operating in accordance with a printer driver 210 stored in the storage unit 21, functions as a receiving section 200, a generating section 201, a transmitting section 202, a receiving section 203, a comparing section 204, a record instructing section 205, a display controlling section 206, and the like. The record instructing section 205 is one example of a recording section. Details about each of the sections 200 to 206 will be described later.

The storage unit 21 includes read-only memory (ROM), random access memory (RAM), a hard disk, and the like. The storage unit 21 stores programs such as the printer driver 210 and an application 211, and various data such as paper information 212, document data 213A, image data 213B, a history table 214, and image information 215. The history table 214 is one example of history information. Note that in this specification, the term "record" is used in the case of writing information into specific data, and the term "store" is used in the case of writing information to the storage unit 21.

The printer driver 210 converts document data 213A and image data 213B to be printed into print data stated in a page description language (PDL) such as Portable Document Format (PDF), PostScript (registered trademark), or Printer Command Language (PCL) interpretable by the printer 3, and also generates print instructions (hereinafter, also called a "print job") including the print data and print parameters, and transmits the print instructions to the printer 3. The printer driver 210 is provided in correspondence with the printer 3 connected to the print instructing device 2.

The application 211 is a program that creates the document data 213A and the image data 213B. The application 211 includes a document creation program, a diagram creation program, a spreadsheet program, and the like, for example. Also, when the application 211 is instructed to execute printing with respect to the document data 213A and the image data 213B, the application 211 instructs the printer driver 210 to perform various operations via a graphic device interface (GDI; not illustrated).

The paper information 212 is information recording a size of paper (hereinafter also simple called a "paper size") for each type of paper. Paper is one example of a print medium. Hereinafter, a size recorded in the paper information 212 will also be called a "standard size".

In other words, a "standard size" refers to a paper size anticipated by the printer driver 210 at a specific point in time (such as the point in time when the printer driver 210 is installed in the print instructing device 2, for example). "Standard sizes" include paper sizes indicated by specific standards, such as "A4" and "B5", for example. Which paper sizes to treat as standard sizes or not are determined for each printer driver 210.

In contrast, a paper size not anticipated by the printer driver 210 at the specific point in time above will also be called a "non-standard size". Paper having a non-standard size does not have to be recorded in the paper information 212. One example of a "non-standard size" is a paper size expressed in specific dimensions, such as 100 mm×200 mm. "Paper of non-standard size" includes, for example, non-rectangular postcards, homemade envelopes, homemade posters, homemade flyers, calendars, wrapping paper, and the like.

The history table 214 (see FIGS. 7A to 7D) records information related to printing performed on paper of non-standard size from among the printing executed by the printer 3 so far. For example, the history table 214 includes a "size" field that records size information indicating the actual dimensions of paper of non-standard size, and a "paper quality" field that records paper quality information indicating a paper quality set as an execution parameter (hereinafter also called a "print parameter") when printing is executed (see FIGS. 7A to 7D). Details about the generating and updating of the history table 214 will be described later.

"Paper quality" refers to a set value of a print parameter related to the properties of the paper, such as the type of paper and the classification of paper. "Paper quality"

includes "plain paper", "thick paper", "thin paper", "recycled paper", "OHP film", "label paper", "index paper", "coated paper", "TAC film", "postcard paper", "envelope paper", and the like, and other set values defined by the user, for example. The printer 3 is configured to execute printing by adjusting print operations, such as the fusing temperature when fusing recording material such as toner onto paper and the speeds of paper feeding and delivery, according to the paper quality set by the print job.

Note that the history table 214 may be updated and managed by the print instructing device 2 inside the device, or alternatively, the print instructing device 2 may acquire the history table 214 at a specific timing from the printer 3 connected to the print instructing device 2.

Figure 3A:
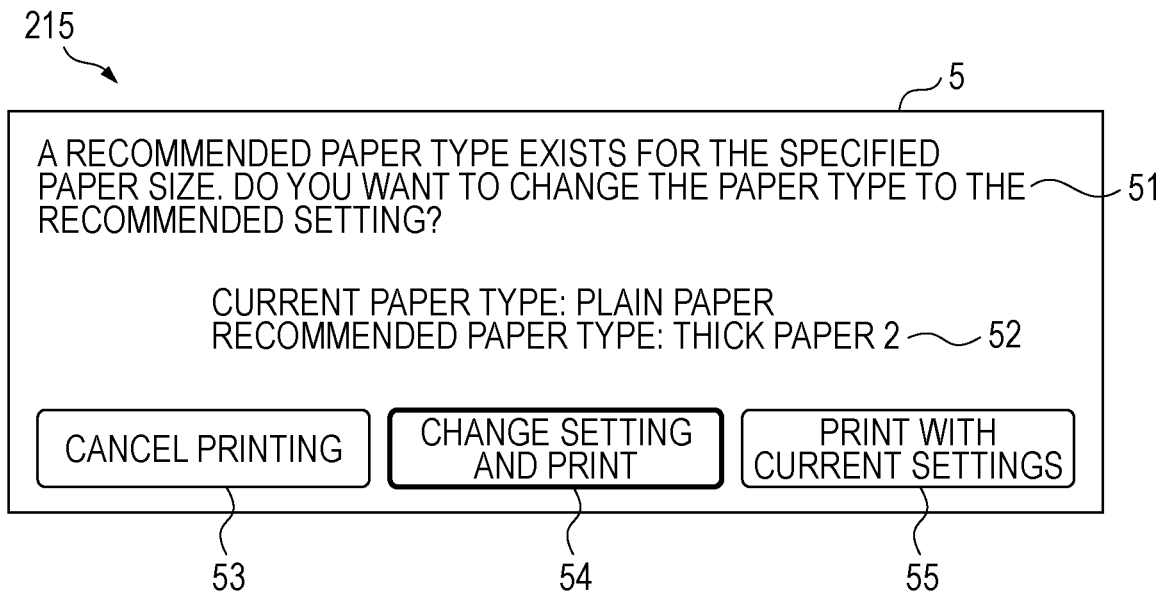
Figure 3B:
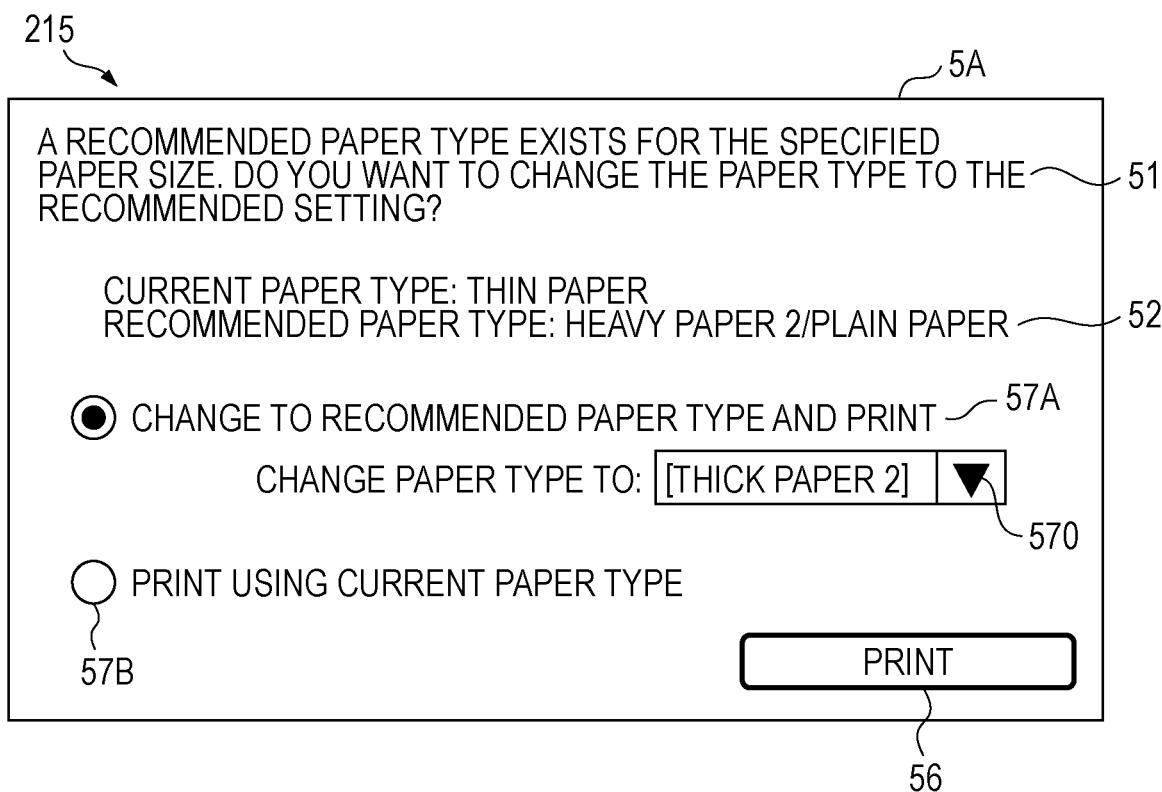

Next, FIGS. 3A and 3B will be referenced to describe the image information 215. FIGS. 3A and 3B are diagrams illustrating examples of notification screens, in which FIG. 3A illustrates one example of a first notification screen, and FIG. 3B illustrates one example of a second notification screen. The image information 215 is information related to screens whose display on the display unit 24 is controlled by the display controlling section 206 described later. For example, the image information 215 includes a first notification screen 5, a second notification screen 5A, and the like.

The first notification screen 5 and the second notification screen 5A are screens that present the paper quality designated as a print parameter and other recommended paper qualities to the user, and also query the user regarding whether or not to change the paper quality.

As illustrated in FIG. 3A, the first notification screen 5 includes, for example, a query message 51 querying the user regarding whether or not to change the paper quality, a paper classification display field 52 displaying the paper quality designated as a print parameter by the user (also called the "current paper type") and a recommended paper quality (also called the "recommended paper type"), a cancel button 53 that cancels printing, a change and print instruction button 54 giving an instruction to change the paper quality to the other paper quality displayed in the paper classification display field 52 and execute printing, a print instruction button 55 giving an instruction to execute printing treating the paper quality designated by the user as a print parameter, and the like. The query message 51 is one example of confirmation information. The paper classification display field 52 is one example of recommendation information.

Also, as illustrated in FIG. 3B, in addition to the set fields provided on the first notification screen 5, the second notification screen 5A additionally may be provided with a first select button 57A and a second select button 57B that select whether or not to change the paper quality with a check box or the like for example, and include a designation field 570 that, in the case in which multiple paper types are recommended in the paper classification display field 52, enables a designation by a method such as a pull-down menu of which paper type among the multiple recommended paper types to select, and also a print button 56 giving an instruction to print using the paper quality selected by the first or second select button 57A or 57B. Note that one of either the first select button 57A or the second select button 57B is configured to be selectable.

The input unit 23 and the display unit 24 may be provided separately, or may be provided as an operation display unit in which an input unit and a display unit are unified. In the case of providing the input unit 23 and the display unit 24 in a unified manner, a touch panel display having a touch panel overlaid or underlaid on a display such as a liquid crystal display may be used as the operation display unit, for example.

The communication unit 25 transmits and receives signals with an external device such as the printer 3 over the network 4. The communication unit 25 is realized by a network interface card (NIC) or the like, for example.

Next, each of the sections 200 to 206 of the control unit 20 will be described. The receiving section 200 receives various operations and signals input from the input unit 23. For example, the receiving section 200 receives a demand for printing (also called a "print demand" or a "print request") based on a user operation.

The generating section 201 generates information giving an instruction to execute printing (hereinafter also called "print instruction information"). Hereinafter the print instruction information will also be called simple a "print job". The print parameters include the type of paper, paper attribute information related to attributes of the paper such as the paper size and paper quality described above, and print modes such as black and white or color printing, simplex or duplex printing, and the number of copies to print.

The transmitting section 202 controls the communication unit 25 to transmit information and signals to the printer 3 over the network 4. The receiving section 203 controls the communication unit 25 to receive information and signals transmitted from the printer 3 over the network 4.

The comparing section 204 compares information or cross-checks information, and outputs the result. Specifically, the comparing section 204 cross-checks the paper size designated as a print parameter by the print request against the paper information 212 in the storage unit 21, and outputs a result of determining whether or not the paper size designated by the print request is included in the history table 214, that is, whether the paper size designated by the print request is a standard size or a non-standard size.

Also, in the case in which the paper size designated by the print request is a non-standard size, the comparing section 204 compares the paper size designated by the print request to paper sizes recorded in the "size" field of the history table 214, and outputs a result of determining whether or not the paper size designated by the print request matches at least one of the paper sizes recorded in the "size" field of the history table 214, that is, whether or not the paper size designated by the print request is included in the history table 214.

In other words, the comparing section 204 outputs a result of determining whether or not the printer 3 so far has ever executed printing on paper of the same type as the paper of non-standard size designated by the print request.

Additionally, in the case in which the paper size designated by the print request matches at least one of the paper sizes recorded in the "size" field of the history table 214, the comparing section 204 compares the paper quality designated by the print request to the paper quality corresponding to the paper size designated by the print request (that is, the at least one paper size) from among the paper qualities recorded in the "paper quality" field of the history table 214, and determines whether or not the paper quality designated by the print request matches the paper quality corresponding to the paper size recorded in the history table 214.

In other words, the comparing section 204 outputs a result of determining whether or not the combination of paper size and paper quality designated by the print request is a combination with the printer 3 has ever executed printing so far.

The record instructing section 205 instructs the designated printer 3 to record information in the history table 214. As one example, the record instructing section 205 may control the communication unit 25 to transmit, to the designated printer 3, information to add to the history table 214 together with update command information commanding the printer 3 to update the history table 214, and thereby instruct the printer 3 to record information in the history table 214. Note that the record instructing section 205 may also record information in the history table 214 stored in the storage unit 21 of the device itself (that is, the print instructing device 2).

The display controlling section 206 controls the display unit 24 to display various information. For example, the display controlling section 206 controls the display unit 24 to display the first notification screen 5 or the second notification screen 5A.

(Configuration of Printer 3)

FIG. 4 is a block diagram illustrating a control system of the printer 3 illustrated in FIG. 1. The printer 3 is provided with a control unit that controls each unit, a storage unit 31 that stores various data, an image output unit 32 that prints and outputs print data, and a communication unit 35 that communicates with the print instructing device 2 over the network 4.

The control unit 30 of the printer 3 includes a central processing unit (CPU), an interface, and the like. The control unit 30 of the printer 3, by operating in accordance with a program 310 stored in the storage unit 31, functions as a receiving section 300, a transmitting section 301, an updating section 302, an executing section 303, and the like. The updating section 302 is one example of a recording section. Details about each of the sections 300 to 303 will be described later.

The storage unit 31 of the printer 3 includes read-only memory (ROM), random access memory (RAM), a hard disk, and the like. The storage unit 31 stores the program 310, and various data such as the paper information 212 and the history table 214 described above.

The image output unit 32 prints and outputs a color image or a black and white image on paper by an electrophotographic system, an inkjet system, or the like, for example. The communication unit 35 is realized by a network interface card (NIC) or the like, and transmits and receives signals with the print instructing device 2, for example.

Next, each of the sections 300 to 303 of the control unit 30 will be described. The receiving section 300 of the printer 3 controls the communication unit 35 of the printer 3 to receive information and signals transmitted from the print instructing device 2 over the network 4. The transmitting section 301 of the printer 3 controls the communication unit 35 of the printer 3 to transmit information and signals to the print instructing device 2 over the network 4.

The updating section 302 updates the history table 214 stored in the storage unit 31 of the printer 3. "Updating" refers to adding information to the history table 214.

Note that the updating section 302 may update the history table 214 according to update command information transmitted from the print instructing device 2, and may also update the history table 214 in the case in which the combination of paper size and paper quality set by a print job is not recorded in the history table 214 of the storage unit 31 of the device itself (the printer 3).

The executing section 303 controls the image output unit 32 to execute printing according to a print job transmitted from the print instructing device 2.

(Operations of First Exemplary Embodiment)

Figure 5:
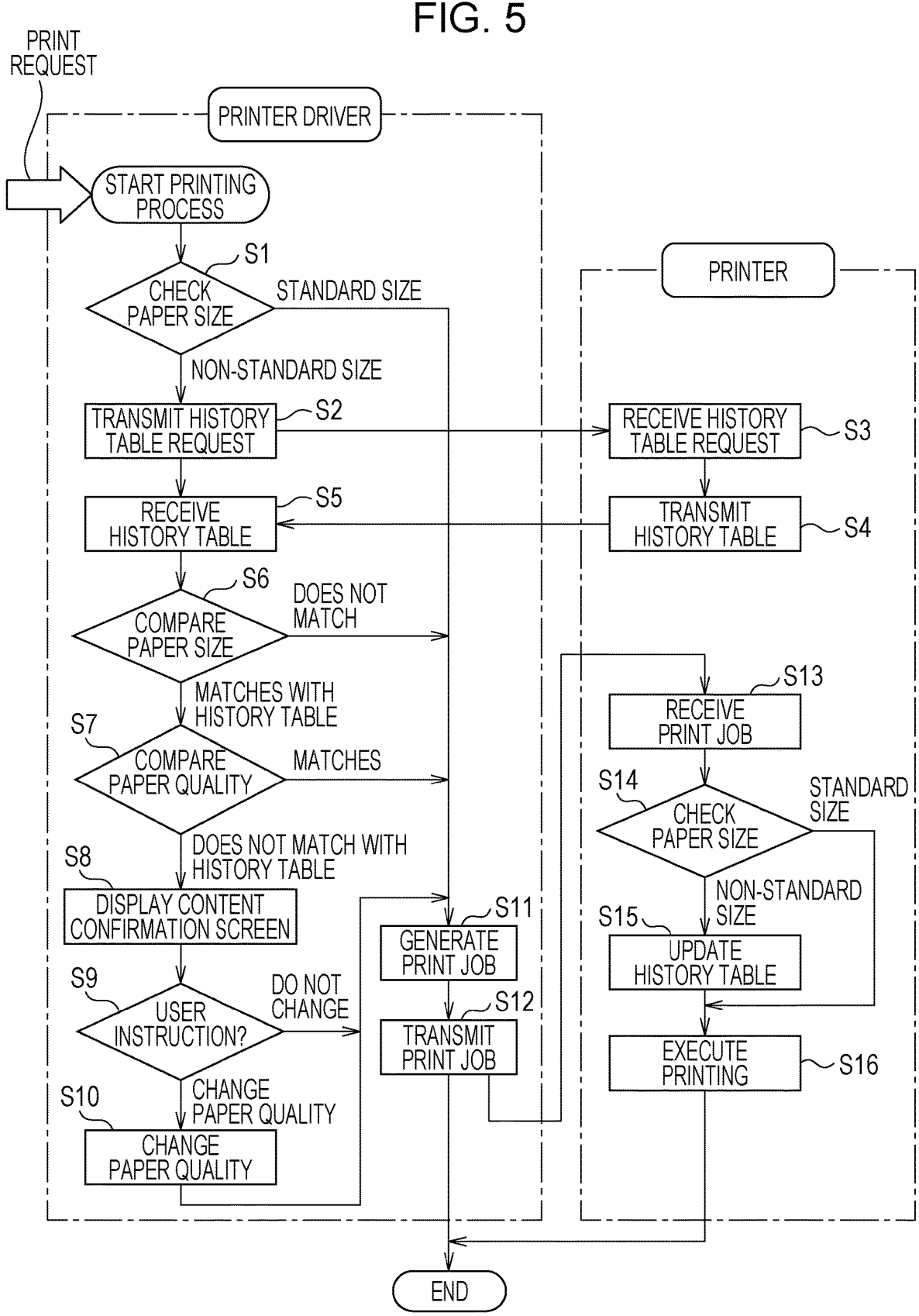
FIG. 5 is a sequence diagram illustrating one example of operations of the printing system according to the first exemplary embodiment of the present disclosure.

Next, one example of the operations of the printing system 1 according to the first exemplary embodiment will be described with reference to FIG. 5. FIG. 5 is a sequence diagram illustrating one example of a first operation of the printing system according to the first exemplary embodiment.

As illustrated in FIG. 5, when the receiving section 200 receives a print request in which a paper size and a paper quality are designated as print parameters by a user operation performed on the print instructing device 2, the comparing section 204 cross-checks the paper sized designated by the print request against the paper information 212 in the storage unit 21, and determines whether the paper size is a standard size or a non-standard size (S1).

In the case in which the paper size designated by the print request is a non-standard size (S1: "non-standard size"), the transmitting section 202 of the print instructing device 2 transmits, to the designated printer 3, a history table request demanding the history table 214 (S2).

The receiving section 300 of the printer 3 receives the history table request transmitted from the print instructing device 2 (S3). In response to the history table request, the transmitting section 301 of the printer 3 transmits the history table 214 to the print instructing device 2 (S4).

Next, the receiving section 203 of the print instructing device 2 receives the history table 214 transmitted from the printer 3 (S5).

The comparing section 204 compares the non-standard paper size designated by the print request to the paper size recorded in the "size" field of the history table 214 (S6), and checks whether or not the non-standard paper size designated by the print request matches a paper size recorded in the "size" field of the history table 214.

In the case in which the paper size matches a paper size recorded in the "size" field of the history table 214 (S6: "matches with history table"), the comparing section 204 additionally compares the paper quality designated by the print request to a paper quality corresponding to the paper size matching that paper size designated by the print request in the history table 214 (S7). The "paper quality corresponding to the paper size" refers to the paper quality recorded in association with the relevant paper size in the history table 214 (the same applies hereinafter).

In the case in which the paper quality designated by the print request does not match the paper quality associated with the paper size matching the paper size designated by the print request in the history table 214 (S7: "does not match with history table"), the display controlling section 206 controls the display unit 24 to display the first notification screen 5 or the second notification screen 5A as illustrated in FIGS. 3A and 3B (S8).

If the user issues an instruction to change the paper quality appropriately on the displayed first notification screen 5 or second notification screen 5A (S9: "change paper quality"), the generating section 201 changes the paper quality designated by the print request to another paper quality designated by the first notification screen 5 or the second notification screen 5A (S10), and also generates a print job including the changed paper quality as a print parameter (S11).

The receiving section 200 of the print instructing device 2 transmits the generated print job to the designated printer 3 (S12).

The receiving section 300 of the printer 3 receives the print job transmitted from the print instructing device 2 (S13).

In the case in which the paper size set by the print job is a non-standard size (S14: "non-standard size"), the updating section 302 adds information about the non-standard size and information about the paper quality to the history table 214 and saves the history table, or in other words, updates the history table 214 (S15). Note that the updating section 302 may also update the history table 214 according to update command information transmitted from the print instructing device 2.

The executing section 303 of the printer 3 controls the image output unit 32 to execute printing according to the received print job (S16).

Note that in the following cases (i) to (iii), the generating section 201 generates a print job including the paper quality designated by the print request received by the receiving section 200 as a print parameter (S11). In this case, the display controlling section 206 does not have to control the display unit 24 to display the first notification screen 5 or the second notification screen 5A described above.

(i) The case in which the paper size designated by the print request is a standard size (S1: "standard size");

(ii) The case in which the paper size designated by the print request is a non-standard size (S1: "non-standard size"), but the paper size does not match a paper size recorded in the "size" field of the history table 214 (S6: "does not match"); or (iii) The case in which the paper size designated by the print request is a non-standard size (S1: "non-standard size") and the paper size matches a paper size recorded in the "size" field of the history table 214 (S6: "matches with history table"), but the paper quality designated by the print request matches a paper quality associated with the paper size that matches the paper size designated by the print request in the history table 214 (S7: "matches").

WORKING EXAMPLE

Figure 6:
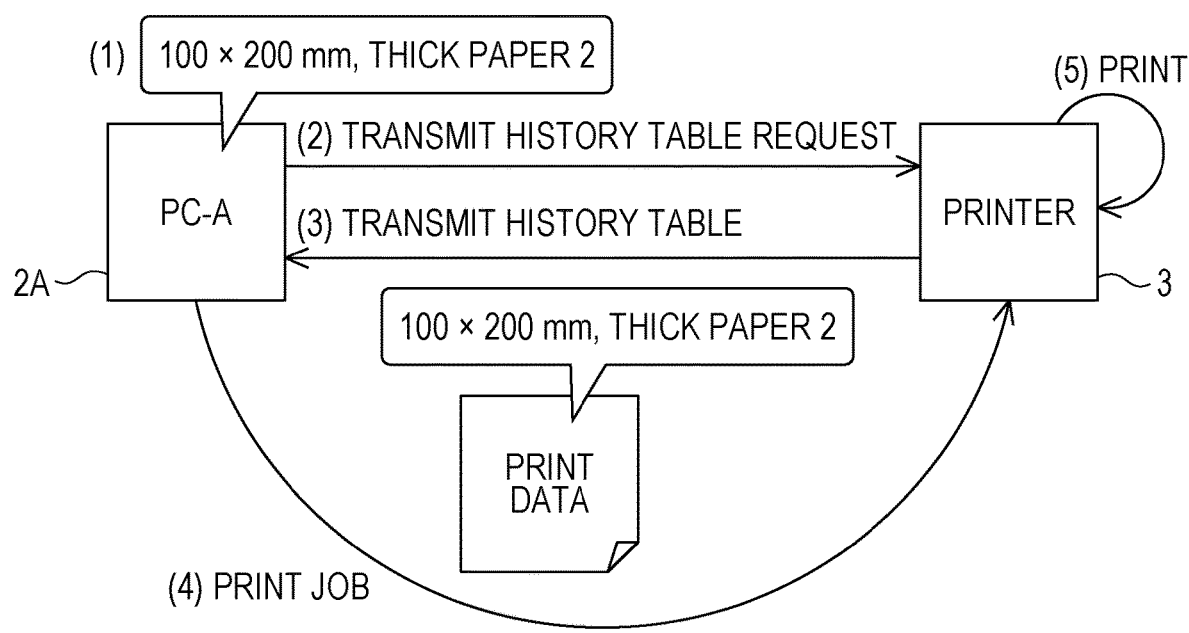
FIG. 6 is a diagram schematically illustrating one example of executing printing on paper of a non-standard size.

Next, a working example of the printing system 1 according to the first exemplary embodiment of the present disclosure will be described with reference to FIG. 6 and FIGS. 7A to 7D. FIG. 6 is a diagram schematically illustrating one example of executing printing on paper of a non-standard size. FIGS. 7A to 7D are diagrams illustrating examples of the history table 214, and together illustrate one example of updating the history table 214.

Hereinafter, for the sake of convenience, a configuration in which the three print instructing devices 2A, 2B, and 2C illustrated in FIG. 1 are provided will be described as an example. Also, among the three print instructing devices 2A, 2B, and 2C, the first user who uses the print instructing device 2A (PC-A) will be designated "user A", the second user who uses the print instructing device 2B (PC-B) will be designated "user B", and the third user who uses the print instructing device 2C (PC-C) will be designated "user C".

Also, as illustrated in FIG. 7A, the case of starting operation with the history table 214 in an empty state, or in other words, a state in which no information is recorded in the history table 214, will be described as an example. Note that in the following description, unless specifically noted otherwise, operations are assumed to be performed by the printer driver (that is, each section of the control unit 20) of the PC-A, PC-B, and PC-C, as well as by each section of the control unit of the printer 3.

(1) Operations by User A

As illustrated in FIG. 6, suppose that the user A operates the PC-A to issue a print request designating a non-standard size ("100×200 mm") as the paper size, designating "thick paper 2" as the paper quality, and demanding the execution of printing (see (1) in FIG. 6).

In this case, the PC-A transmits a history table request to the printer 3 connected to itself (PC-A) (see (2) in FIG. 6).

The printer 3 receiving the history table request transmits the history table 214 saved in itself (printer 3) to the PC-A (see (3) in FIG. 6).

The PC-A checks whether or not the history table 214 includes history information indicating that printing has been executed with respect to paper of the non-standard paper size (100×200 mm).

As described above, since the history table 214 is an empty state, and the non-standard size is not recorded in the history table 214, the PC-A generates a print job including the parameters, namely, print parameters setting the paper size to "100×200 mm" and setting the paper quality to "thick paper 2", and transmits the print job to the printer 3 (see (4) in FIG. 6).

The printer 3 executes printing according to the received print job (see (5) in FIG. 6).

As illustrated in FIG. 7B, the printer 3 saves the setting information of the paper size (specifically, "100×200 mm") and the paper quality (specifically, "thick paper 2") set by the print job in the history table 214.

(2) Operations by User B

Next, the case in which the user B performs operations will be described. Note that a schematic diagram corresponding to FIG. 6 will be omitted. Suppose that the user B operates the PC-B to issue a print request designating a non-standard size (100×200 mm) as the paper size, designating "plain paper" as the paper quality, and demanding the execution of printing.

The PC-B transmits a history table request to the printer 3 connected to itself (PC-B).

The printer 3 receiving the history table request transmits the history table 214 saved in itself (printer 3) to the PC-B.

The PC-B checks whether or not the history table 214 includes history information indicating that printing has been executed with respect to paper of the non-standard paper size (100×200 mm).

The non-standard size (100×200 mm) is being used in the printing directed from the PC-A described above, and therefore is recorded in the "size" field of the history table 214, as illustrated in FIG. 7B.

Next, the PC-B compares the paper quality ("plain paper") designated by the print request to the paper quality associated with the non-standard size (100×200 mm) recorded in the "size" field of the history table 214 illustrated in FIG. 7B, or in other words, the paper quality ("thick paper 2") used in the printing executed according to the instructions from the PC-A.

Like the working example, in the case in which the paper quality ("plain paper") designated by the print request does not match the paper quality ("thick paper 2") corresponding to the paper size recorded in the history table 214, as illustrated in FIG. 3A, the first notification screen 5 is presented to the user B.

In the case in which the user B selects the change and print instruction button 54 on the first notification screen 5, the PC-B changes the paper quality from "plain paper" to "thick paper 2", generates a print job, and transmits the print job to the printer 3.

In this case, the printer 3 receiving the print job executes printing according to the print job. Note that the printer 3 does not update the history table 214. The reason is because the paper quality designated by the print job is the same as the information ("thick paper 2") already recorded in the history table 214.

In contrast, in the case in which the user B selects the print instruction button 55 on the first notification screen 5, the PC-B generates a print job without changing the paper quality from "plain paper", and transmits the print job to the printer 3.

In this case, the printer 3 receiving the print job executes printing according to the print job, and as illustrated in FIG. 7C, adds the combination of setting the paper size to "100×200 m" and the paper quality to "plain paper" designated by the print job to the history table 214.

(3) Operations by User C

Next, the case in which the user C performs operations will be described. Note that a schematic diagram corresponding to FIG. 6 will be omitted. Suppose that the user C operates the PC-C to issue a print request designating a non-standard size (100×200 mm) as the paper size, designating "thin paper" as the paper quality, and demanding the execution of printing.

The PC-C transmits a history table request to the printer 3 connected to itself (PC-C).

The printer 3 receiving the history table request transmits the history table 214 saved in itself (printer 3) to the PC-C.

The PC-C checks whether or not the history table 214 includes history information indicating that printing has been executed with respect to paper of the non-standard paper size (100×200 mm).

Next, the PC-C compares the paper quality ("thin paper") designated by the print request to the paper qualities associated with the non-standard size (100×200 mm) recorded in the "size" field of the history table 214 illustrated in FIG. 7C, or in other words, the paper quality ("thick paper 2") used in the printing executed according to the instructions from the PC-A and the paper quality ("plain paper") used in the printing executed according to the instructions from the PC-B.

Like the working example, in the case in which the paper quality ("thin paper") designated by the print request does not match the paper qualities ("thick paper 2" and "plain paper") corresponding to the paper size recorded in the history table 214, as illustrated in FIG. 3B, the second notification screen 5A is presented to the user C.

In the case in which multiple paper qualities (for example, "thick paper 2" and "plain paper") are recorded in the history table 214 in this way, the screen is configured to allow a specific paper quality to be selected from among the multiple paper qualities (see the designation field 570).

If the user C selects the first select button 57A labeled "Change to recommended paper type and print" on the second notification screen 5A and also selects "thick paper 2" in the designation field 570 and operates the print button 56, the PC-C changes the paper quality from "thin paper" to "thick paper 2", generates a print job, and transmits the print job to the printer 3.

In this case, the printer 3 receiving the print job executes printing according to the print job. Note that the printer 3 does not update the history table 214. The reason is because the paper quality designated by the print job is the same as the information ("thick paper 2") already recorded in the history table 214.

In contrast, if the user C selects the second select button 57B labeled "Print using current paper type" on the second notification screen 5A and operates the print button 56, the PC-C generates a print job without changing the paper quality from "thin paper", and transmits the print job to the printer 3.

In this case, the printer 3 receiving the print job executes printing according to the print job, and as illustrated in FIG. 7D, adds the combination of setting the paper size to "100×200 m" and the paper quality to "thin paper" set by the print job to the history table 214.

by repeatedly performing the operations described in the above working example, the history table 214 inside the printer 3 is updated. Also, every time the history table 214 is updated, the amount of history information accumulated in the printer 3 increases.

Exemplary Modifications

Hereinafter, FIGS. 8A to 8C will be referenced to describe exemplary modifications of the first exemplary embodiment. Each of FIGS. 8A to 8C is a diagram illustrating one example of the history table according to an exemplary modification.

(a) Extraction of Comparison Target According to Error Information

As illustrated in FIG. 8A, the history table 214A additionally may be provided with an "error" field that records, in association with a non-standard size, information indicating whether or not a printing inexpedience (hereinafter also called an "error") such as a paper jam or poor fusing of recording material (for example, toner) occurs. The information indicating whether or not an error occurs is one example of inexpedience information.

In this case, the printer driver (for example, the comparing section 204) may extract each combination of a non-standard size and a paper quality for which "no", which indicates that no error occurred, is recorded in the "error" field, or in other words, each combination of a non-standard size and a paper quality for which no error occurred, and treat only the extracted history information as the comparison target to compare to the paper parameters designated by the print request.

In other words, the receiving section 203 of the print instructing device 2 may receive a history table 214A including only combinations for which "no" is recorded in the "error" field, that is, only information regarding combinations of a non-standard size and a paper quality for which an error does not occur.

The receiving section 203 of the print instructing device 2 may be configured to receive information in which combinations with a "yes" recorded in the "error" field are removed from the transmitted history table 214A. Also, the receiving section 203 of the print instructing device 2 may be configured to select only the combinations with a "no" recorded in the "error" field from the transmitted history table 214A.

Alternatively, the transmitting section 301 of the printer 3 may be configured to transmit, to the print instructing device 2, information in which combinations with a "yes" recorded in the "error" field are removed from the history table 214A. Also, the transmitting section 301 of the printer 3 may be configured to extract only the combinations with a "no" recorded in the "error" field from the history table 214A, and transmit the extracted information to the print instructing device 2.

(b) Extraction of Comparison Target According to User Information

As illustrated in FIG. 8B, the history table 214B additionally may be provided with a "user" field that records, in association with a non-standard size, user identification information that identifies a user. the user identification information that identifies a user corresponds to a name of the user ("user name"), a user ID, or the like, for example. The user identification information is one example of operator identification information. Instead of user identification information, information that identifies the print instructing device 2 (such as the name of the PC, for example) may also be used.

For example, as illustrated in FIG. 8B, the printer driver (for example, the comparing section 204) may extract history information related to the same user as a user who issued the print request from the history table 214B, and treat only the extracted history information related to the same user as the comparison target to compare to the parameters designated by the print request.

In this case, for example, when transmitting the history table request to the printer 3 (see S2 of FIG. 5), it is sufficient for the transmitting section 202 of the print instructing device 2 to transmit user identification information (such as a user name, for example) identifying the user who issues the print request, and it is sufficient for the transmitting section 301 of the printer 3 to extract only the history information related to the user according to the received user identification information, and transmit the extracted history information to the print instructing device 2.

(c) Selection of Information According to Print Job

As illustrated in FIG. 8C, the history table 214C additionally may be provided with a field that records, in association with a non-standard size, information identifying executed printing (hereinafter also called "printing identification information"). The printing identification information corresponds to information indicating the time when printing was executed (hereinafter also called "print time information"), for example.

The time when printing is executed (hereinafter also called the "print time") is sufficiently a time enabling a print job to be specified, and for example may be the time when the receiving section 200 receives the print request, the time when the print job is transmitted from the print instructing device 2 to the designated printer 3, the time when the printer 3 receives the print job, or the time when the execution of printing is started or completed (for example, the time when printed material is output from the printer 3).

In the case in which the history table 214C received from the printer 3 includes history information indicating that printing with the same non-standard size but different paper qualities has been executed repeatedly a predetermined number of times or greater within a predetermined period, the printer driver (for example, the comparing section 204) may extract the combination recorded with the most recent time from among the repeatedly executed combinations of the non-standard size and a paper quality, and treat only the extracted history information as the comparison target to compare to the parameters designated by the print request.

Second Exemplary Embodiment

Figure 9:
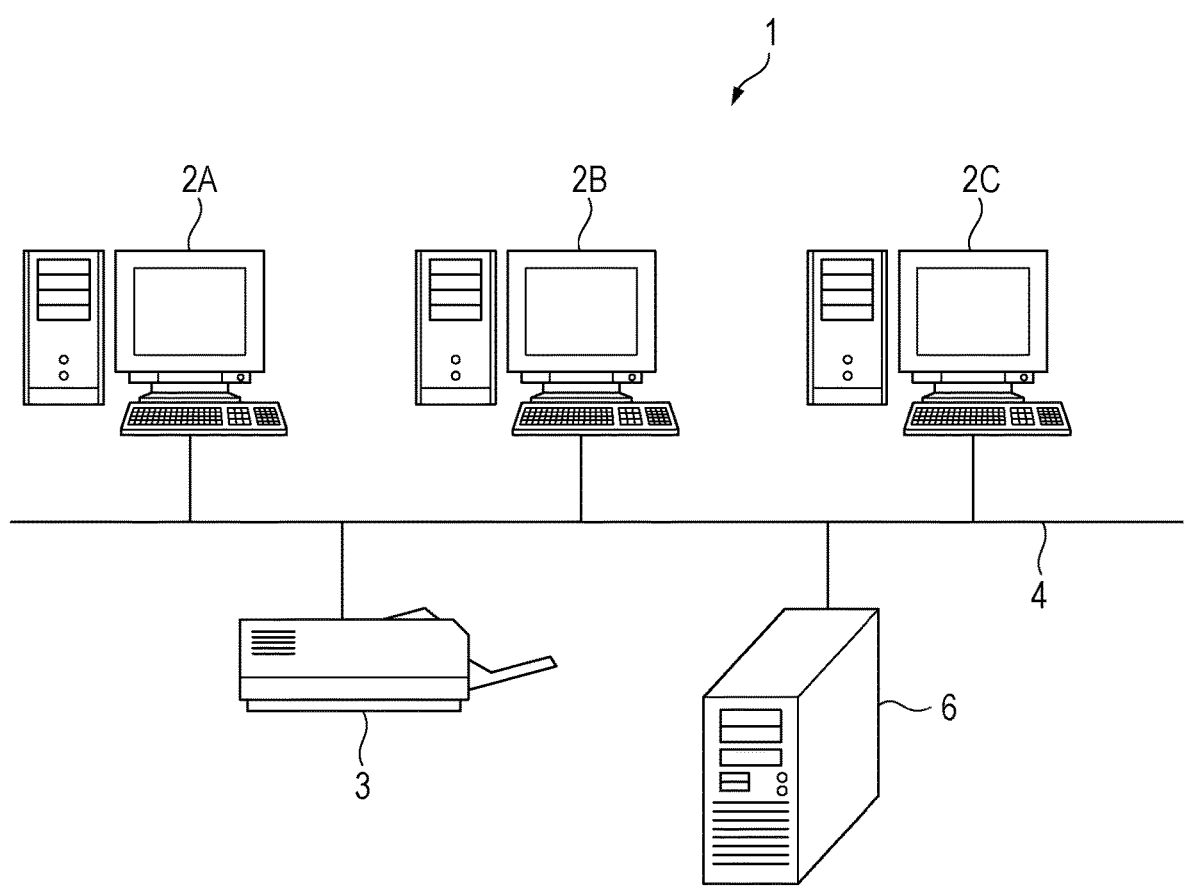
FIG. 9 is a diagram illustrating an exemplary configuration of a printing system according to a second exemplary embodiment of the present disclosure.

Next, the second exemplary embodiment will be described with reference to FIG. 9. FIG. 9 is a diagram illustrating an exemplary configuration of the printing system according to the second exemplary embodiment of the present disclosure. As illustrated in FIG. 9, the printing system 1 in the second exemplary embodiment is different from the printing system 1 in the first exemplary embodiment by additionally being provided with a print server 6.

The printing system 1 includes the print instructing devices 2, the printer 3, and the print server 6 connected to these print instructing devices 2 and the printer 3 over the network 4. The print server 6 is a digital front end (DFE) device, for example. The print server 6 is one example of an image processing device.

The history table 214 described above may be provided inside the print server 6. Also, the print server 6 may manage the history table 214.

Note that the second exemplary embodiment also operates similarly to the first exemplary embodiment. A detailed description will be omitted.

The above thus describes exemplary embodiments of the present disclosure, but an exemplary embodiment of the present disclosure is not limited to the foregoing exemplary embodiments, and various modifications are possible within a scope that does not depart from the gist of the present disclosure. For example, the printer 3 in the first exemplary embodiment may also be configured as a unification of the print server 6 and the printer 3 described in the second exemplary embodiment. In other words, the printer 3 in the first exemplary embodiment may be a printing device provided with print server functions.

Also, for example, the generating section 201 may generate a print job when the receiving section 200 receives a print request, and in the case in which the user issues instructs with respect to the first notification screen 5 or the second notification screen 5A, also change the content of the print job according to the instructions. In this case, the print job is one example of a print demand.

Each section of the control units 20 and 30 may also be realized by a hardware circuit such as a field-programmable gate array (FPGA) that is partially or fully reconfigurable, or an application-specific integrated circuit (ASIC).

Furthermore, it is also possible to omit or change some of the structural elements of the foregoing exemplary embodiments, within a scope that does not depart from the gist of the present disclosure. In addition, in the flows of the foregoing exemplary embodiments, steps may be added, removed, changed, rearranged, or the like, within a scope that does not depart from the gist of the present disclosure. Also, a program used by the foregoing exemplary embodiments may be provided by being recorded on a computer-readable recording medium such as a CD-ROM, or may be stored on an external server such as a cloud server and used over a network.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A print instructing device comprising:
a recording section that, in a case in which history information does not include size information indicating a size of a print medium designated by a print demand that demands an execution of printing, records paper quality information indicating a paper quality of the print medium designated by the print demand in association with the size information in the history information; and a display controlling section that, in a case in which the size information is included in the history information and the paper quality information does not match the history information corresponding to the size information, causes confirmation information confirming whether or not to change the designated paper quality to be displayed.

2. The print instructing device according to claim 1, wherein the display controlling section additionally causes recommendation information that recommends changing to a specific paper quality from among one or more paper qualities recorded in the history information to be displayed.

3. The print instructing device according to claim 1, wherein the history information includes inexpedience information indicating whether or not a printing inexpedience occurs, and the display controlling section causes the confirmation information to be displayed according to the inexpedience information.

4. The print instructing device according to claim 3, wherein the display controlling section causes the confirmation information to be displayed in a case in which the size information is included in information for which the printing inexpedience does not occur among the history information and the paper quality information does not match the history information corresponding to the size information.

5. The print instructing device according to claim 1, wherein the history information additionally includes operator identification information that identifies an operator, and the display controlling section causes the confirmation information to be displayed according to the operator identification information.

6. The print instructing device according to claim 5, wherein the display controlling section causes the confirmation information to be displayed in a case in which the size information is included in information regarding the same operator among the history information and the paper quality information does not match the history information corresponding to the size information.

7. The print instructing device according to claim 1, wherein the history information additionally includes printing identification information that identifies an executed printing, and the display controlling section causes the confirmation information to be displayed according to the printing identification information.

8. The print instructing device according to claim 7, wherein the history information additionally includes print time information indicating a time when the printing is executed as the printing identification information.

9. The print instructing device according to claim 8, wherein the display controlling section causes the confirmation information to be displayed in a case in which multiple pieces of the same size information are included in the history information and the paper quality information does not match the history information corresponding to the size information of a most recent print time indicated by the print time information from among the multiple pieces of the same size information.

10. A non-transitory computer readable medium storing a program causing a computer to execute a process for issuing an instruction to print, the process comprising:

in a case in which history information does not include size information indicating a size of a print medium designated by a print demand that demands an execution of printing, recording paper quality information indicating a paper quality of the print medium designated by the print demand in association with the size information in the history information; and in a case in which the size information is included in the history information and the paper quality information does not match the history information corresponding to the size information, causing confirmation information confirming whether or not to change the designated paper quality to be displayed.

11. A printing system comprising:

a printing device;

a recording section that, in a case in which history information does not include size information indicating a size of a print medium designated by a print demand demanding that the printing device execute printing, records paper quality information indicating a paper quality of the print medium designated by the print demand in association with the size information in the history information; and a display controlling section that, in a case in which the size information is included in the history information and the paper quality information does not match the history information corresponding to the size information, causes confirmation information confirming whether or not to change the designated paper quality to be displayed.

\* \* \* \* \*